July 25, 1939.                G. L. N. MEYER                2,167,123
FILLER VALVE
Filed Aug. 3, 1936                2 Sheets-Sheet 1
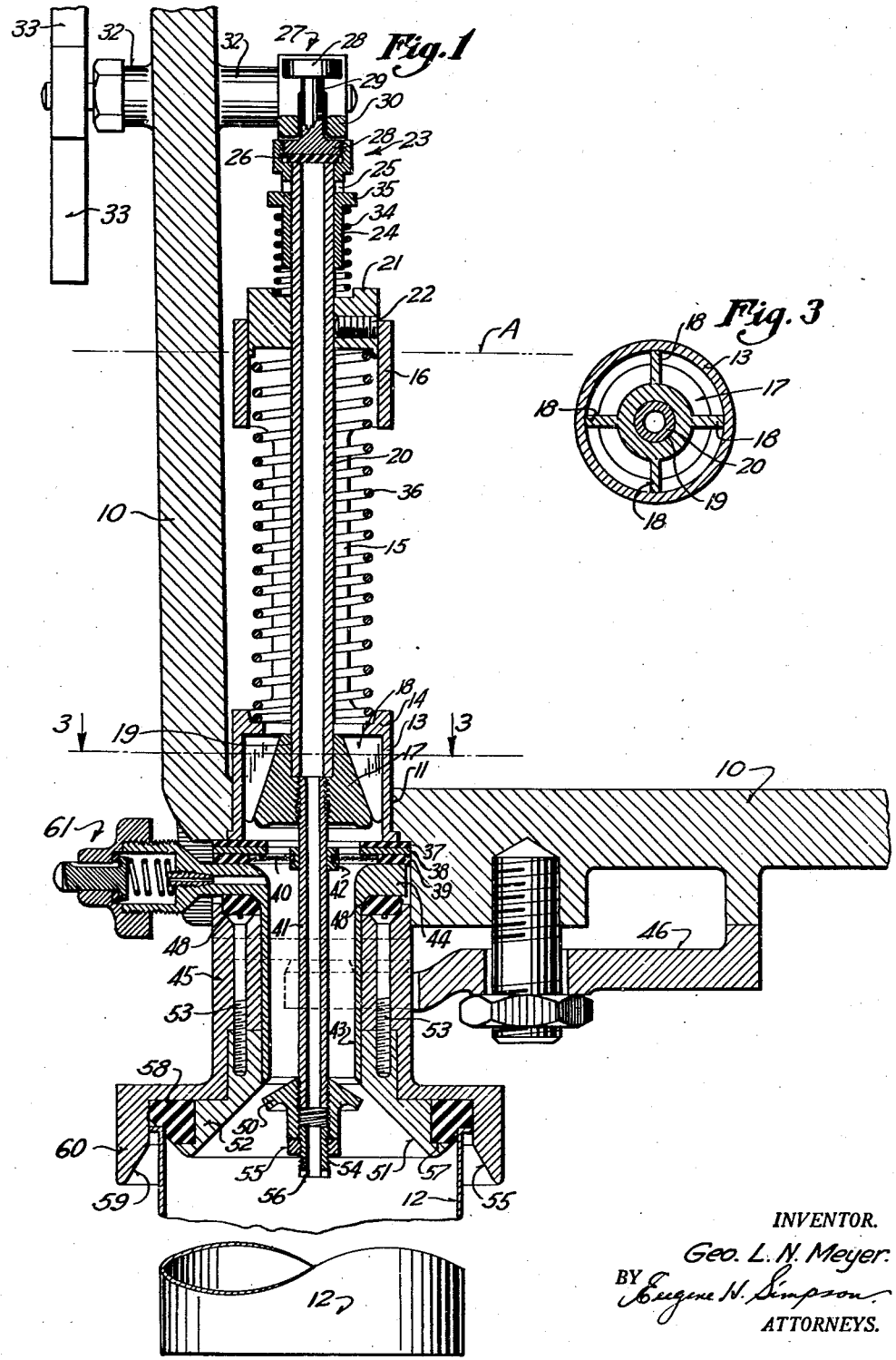
INVENTOR.
Geo. L. N. Meyer.
BY Eugene N. Simpson
ATTORNEYS.

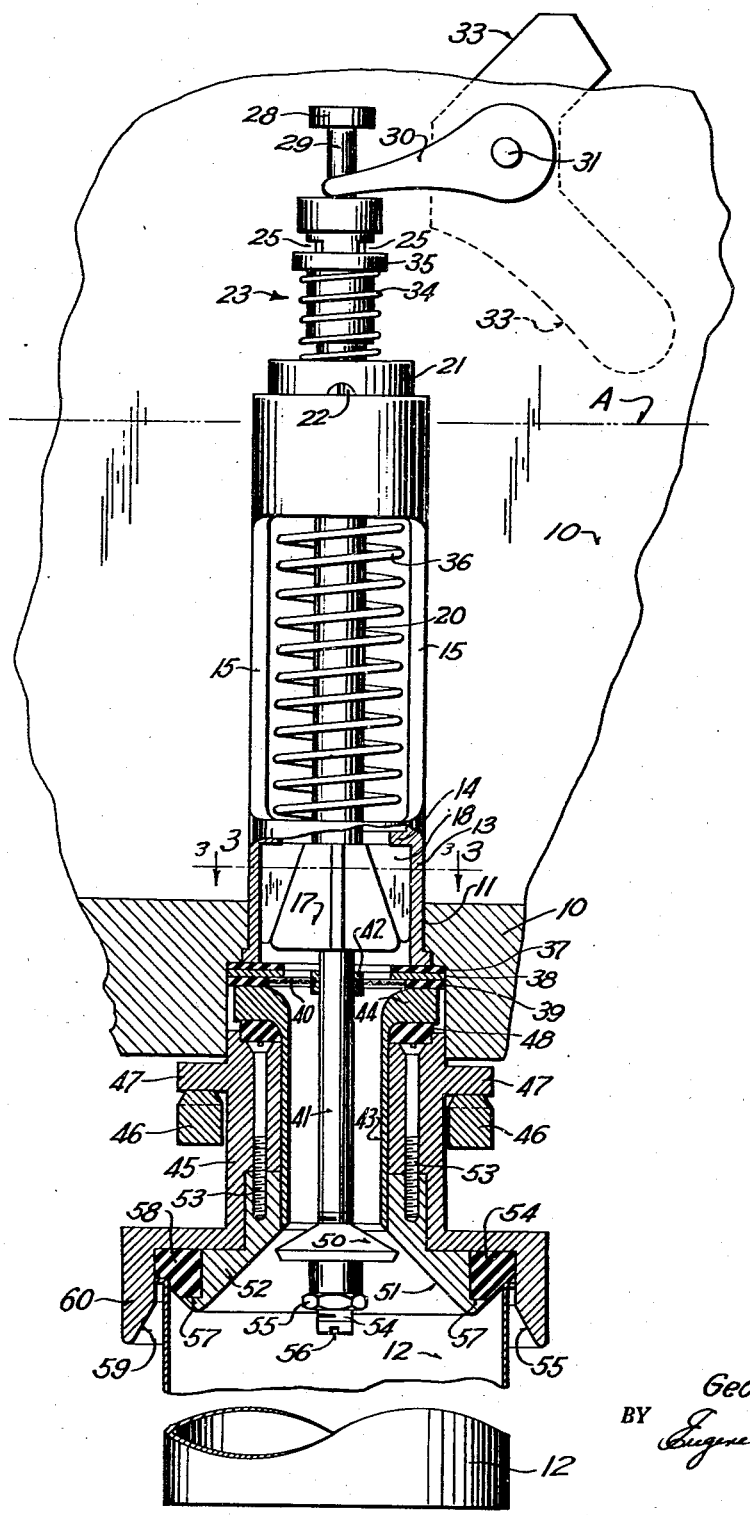

Patented July 25, 1939

2,167,123

UNITED STATES PATENT OFFICE 2,167,123

FILLER VALVE

George L. N. Meyer, Milwaukee, Wis.

Application August 3, 1936, Serial No. 94,015

11 Claims. (Cl. 226—109)

This invention relates to a filler valve for counter-pressure fillers.

In transferring carbonated beverages such as beer and soft drinks from a filling machine to a container it is highly desirable to have the beverage flow into the container with as little agitation as possible so as to minimize the loss of carbonic gas. This result may best be accomplished by causing the beverage to flow out to the sides of the container, and down the sides, thus avoiding splashing and subsequent loss of gas.

One object of the present invention is to provide a filler valve for counter-pressure fillers having a spreader element which will deflect the beverage to the side walls of a wide mouth container to minimize agitation of the beverage.

A further object is to provide a filler valve for counter-pressure fillers having a spreader element for wide mouth containers that can be removed and replaced readily with a spreader of a different size for a different size container.

Another object is to simplify the construction of filler valves, reduce the cost of manufacture, and provide a valve which is readily disassembled for repairs or replacement.

Another object is to provide a valve having an improved means of regulating the quantity of beverage delivered to the container.

A still further object is to provide an improved sealing ring between the valve and the container.

Other objects will become apparent upon consideration of the following specification, taken in connection with the accompanying drawings.

The principles of the invention are illustrated in the accompanying drawings, in which:

Fig. 1 is a vertical cross-section through a filler valve, showing the spreader embodying the invention;

Fig. 2 is a view of a filler valve at right angles to Fig. 1, parts being shown in cross-section; and Fig. 3 is a cross-section on the line 3—3 of Fig. 2.

In the drawings, in which like numerals indicate like parts throughout the several views, a counter-pressure filler bowl 10, in which liquid may be maintained up to the level A, contains a plurality of apertures 11, one of which is shown in the drawings. The apertures 11 are adapted to retain filler valve assemblies which control the flow of fluid to a container 12.

The filler valve comprises a cage 13 which has an open top surrounded by an internal annular shoulder 14. Arms 15 are formed on the top of the cage 13 and support a bearing 16 spaced from and in alignment with the cage 13.

A valve 17 is mounted in the cage 13 and is kept in alignment in the cage by a plurality of guide wings 18 which radiate from the valve and contact the inner surface of the cage 13.

The valve 17 has a hole 19 therethrough in one end of which is mounted a gas conducting tube 20. The gas conducting tube 20 passes through the bearing 16 and is held centered therein by a partition 21, which is adjustably secured on the tube 20 by a set screw 22 or other suitable means.

A valve, generally designated 23, fits over the top of the tube 20 to control the flow of gas therethrough. The valve comprises a sleeve 24 slidable on the tube, with ports 25 in the side adjacent the top, to permit the flow of gas into and out of the tube 20. An annular seat in the top of the tube 20 retains a rubber valve seat 26. The seat 26 is held in position by an actuating head 27 comprising a pair of discs 28 spaced apart by a shank 29.

The valve 23 is actuated by a lever 30 which contacts the heads 28 to positively open or close the valve. The lever 30 is mounted on a shaft 31 which passes through a bearing 32 in the side of the bowl 10. A pair of actuating cams 33—33 are connected to the shaft 31 on the outside of the bowl and contact stationary actuators to open or close the valve 23 at the proper time.

The valve 23 is maintained in open position by a spring 34 which is mounted between the partition 21 and an annular shoulder 35 on the sleeve 24.

A second spring 36 is mounted between the shoulder 14 and the partition 21, and is adapted to open the valve 17 when the fluid pressure within the container builds up to substantially that of the interior of the bowl 10.

The valve 17 seats on a soft rubber valve seat 37, which is supported from below by a metal washer 38. A rubber washer 39 below the washer 38 forms a retainer for a screen or foraminous element 40. The screen 40 has an aperture through the center which is provided with a bearing 42 slidable over a gas conducting tube 41. The tube 41 is secured in the lower end of the valve aperture 19 and slides through the bearing as the valve 17 moves vertically.

A liquid conduit 43 has a collar 44 at the upper end thereof which is pressed against the washer 39 by a cap 45. The cap 45 is held in place by a forked clamp 46 which presses against ears 47 on the cap 45, as clearly shown in Figs. 1 and 2. A rubber packing 48 may be interposed between the collar 44 and the cap 45 to prevent leakage.

Liquid from the bowl 10 flows past the valve 17 and flows down the liquid conduit 43, substantially filling the space between the walls of the liquid conduit and the gas conducting tube 41. A liquid deflector or spreader 50, on which the descending column of liquid impinges, is mounted on the tube 41 below the lower end of the liquid conduit 43, and deflects the liquid outwardly toward the side of the container 12 and onto an interior conical surface 51 of an artificial can top 52 which is supported from the valve assembly. The slope of the surface 51 is made greater than the slope of the cone 50 in order to form a restricted throat or nozzle between the two to increase the velocity of the deflected liquid as it leaves the spreader 50 which insures the liquid following the surface 51 to a point immediately adjacent the side walls of the container.

The space between the outer edge of the top 52 and the inner surface of the container 12 is so small that the liquid spans the gap without losing its stream characteristics and passes evenly down the sides of the container until it reaches the liquid level therein.

The gas is conducted from the tube 41 through the spreader element 50 and into a gas discharge pipe 54. The pipe 54 is adjustably mounted in the lower end of the spreader 50 through the screw threads, and held in adjusted position by the lock nut 55. The lower end of the gas discharge pipe 54 is open to permit the free exit of gas and liquid, and is provided with a slot 56 to accommodate a screwdriver or other suitable tool for adjusting the height of the discharge opening. The elevation of the opening in the lower end of the pipe 54 determines the amount of beverage delivered to the container, in a manner described below.

The artificial top 52 has an outstanding annular shoulder 57 which retains a packing ring 58 between the top 52 and the cap 45. The can or other wide mouth container 12 is pressed into engagement with the packing ring 58, so that the packing ring not only forms a seal between the cap 45 and the top 52, but also between the interior and exterior of the container.

The can or other wide mouth container 12 is guided into position on the packing ring 58 by conical guide surface 59 formed on the interior face of a skirt 60 which depends from the cap 45.

Operation

In operation, a container is delivered to the filler and is raised by pressure cylinders (not shown) into sealing engagement with the packing 58, to which position it is guided by the guide surface 59.

When the seal between the container 12 and the packing 58 is completed an actuator (not shown) moves the cam 33 and opens the valve 23. Opening the valve 23 admits gas under pressure through the tubes 20 and 41 and into the container 12.

When the pressure in the container 12 is substantially equal to that in the bowl 10, the spring 36 opens the valve 17 and permits liquid from the bowl to flow down the liquid conduit 43, substantially filling the space between the conduit 43 and the gas tube 41.

In descending the conduit 43, the liquid impinges on the spreader 50 and the stream is deflected outwardly at increased velocity onto the inverted conical surface 51. The cone 51 conducts the liquid stream toward the side walls of the container 12. The liquid after leaving the lower edge of the surface 51 has sufficient velocity to jump the gap between the edge of the surface 51 and the side walls of the container, and flows down the sides of the container to the liquid level therein without the splashing which usually occurs in such apparatus.

When liquid rises above the lower opening 56 in the gas discharge pipe 54 the air is trapped in the container and liquid passage and stops the flow of liquid downwardly. Liquid already in the conduit 43 flows down and is forced up the tubes 20 and 41, and may flow out the valve 23.

Both valves 17 and 23 are then closed by the lever 30, the excess gas sniffed off through the snift valve 61, and the container removed from the filling machine and conveyed to a capper.

For more complete details of the construction and operation of the valves 17, 23 and 61 see the co-pending application of George L. N. Meyer, Serial No. 674,405, filed June 5, 1933.

Having described the invention it is realized that it is susceptible to various changes and modifications and it is not, therefore, desired to limit the invention to the precise form herein shown and described but only by the scope of the appended claims.

What is claimed as new and desired to secure by Letters Patent is:

1. In a valve assembly adapted to control the flow of fluid from a supply source to a container to be filled, a liquid conduit to conduct liquid to the container, a valve to control the flow of liquid through said conduit, a gas tube mounted in said conduit, a spreader element mounted on said tube below said valve and adapted to divert the liquid in the conduit toward the side of the container, and an artificial top for said container mounted in the valve assembly and adapted to receive liquid from said spreader and conduct it to a point adjacent the side walls of the container.

2. In a valve adapted to control the flow of fluid from a filler bowl to a container to be filled, a liquid conduit depending from said valve and adapted to conduct liquid into the container, a gas tube in said conduit connected to and movable vertically with said valve, a spreader element mounted on said tube below said conduit, and an artificial top for said container mounted from the valve adjacent the spreader and adapted to receive the liquid stream deflected by said spreader and conduct the same to a point adjacent the side of the container.

3. A valve assembly to control the flow of fluid from a filler bowl to a container to be filled, comprising, a liquid conduit, a valve element at the upper end of said conduit, a sloping artificial top formed at the lower end of said conduit, and a conical spreader element mounted below the lower end of said conduit and adapted to divert liquid flowing downwardly through said conduit onto said artificial top for delivery to the side wall of the container, said artificial top having a greater slope than said spreader to form a nozzle effect therebetween and increase the velocity of flow as the liquid leaves the spreader.

4. In a valve adapted to control the flow of fluid from a filler bowl to a container to be filled, a vertical liquid conduit to conduct liquid from the bowl to the container, a valve at the upper end of said conduit to control the flow of liquid therethrough, a gas tube mounted in said conduit, a conical spreader element mounted on said tube below said conduit and adapted to divert liquid toward the sides of the container, and an artificial top for said container adapted to receive the liquid from said spreader and deliver the liquid at a point adjacent the sides of the container.

5. A device as recited in claim 4 in which the artificial top is the interior surface of a cone.

6. In a valve adapted to control the flow of fluid from a filler bowl to a container to be filled, a liquid conduit between said bowl and said container, a spreader element at the container end of the conduit adapted to diffuse liquid flowing through said conduit toward the side of said container, and an artificial top for said container disposed adjacent said spreader to receive liquid from said spreader and deliver it to the container wall, said spreader and said top being arranged to form a restricted throat therebetween whereby the velocity of the liquid is increased as the liquid flows from the spreader to the top.

7. In a valve adapted to control the flow of fluid from a filler bowl to a container, a vertical liquid conduit joining said bowl with said container and controlled by said valve, a conical spreader element mounted below said conduit to diffuse liquid flowing through said conduit toward the side walls of the container, and an artificial top for said container comprising an interior surface of a cone of greater slope than that of said spreader to receive the liquid from said spreader and deliver it to the side walls of the container.

8. A valve assembly to control the flow of fluid from a filler bowl to a container to be filled comprising, a liquid conduit adapted to receive liquid from the filler bowl, and deliver it to the container, a valve to control the flow of liquid through said conduit, an outwardly and downwardly flaring artificial top for said container formed at the lower end of said conduit, and a conical spreader element mounted below said valve and in the path of liquid passing through said conduit and adapted to divert the liquid onto said artificial top for guidance to the side wall of the container, said spreader having a lesser slope than said top to form a nozzle effect therebetween and increase the velocity of flow as the liquid leaves the spreader.

9. A valve assembly to control the flow of fluid from a filler bowl to a container to be filled comprising, a liquid conduit adapted to receive liquid from the filler bowl, and deliver it to the container, a valve to control the flow of liquid through said conduit, an outwardly and downwardly flaring artificial top for said container formed at the lower end of said conduit, and a spreader element mounted below said valve and connected thereto, said element being in the path of liquid passing through said conduit to divert the liquid onto the artificial top for guidance to the side wall of the container.

10. A valve assembly to control the flow of fluid from a filler bowl to a container to be filled, comprising, a liquid conduit, a valve element at the upper end of said conduit, a conical spreader element mounted below the lower end of said conduit and adapted to divert liquid outwardly toward the side walls of the container, and a sloping artificial top formed at the lower end of said conduit above said spreader element and extending radially beyond the spreader element to receive liquid from the said spreader and deliver the same to the side walls of the container, said artificial top having a greater slope than said spreader to form a nozzle effect therebetween and increase the velocity of the liquid as it leaves the spreader element.

11. A valve assembly to control the flow of liquid from a filler bowl to a container to be filled comprising, a liquid conduit adapted to receive liquid from the filler bowl and deliver it to the container, a valve at the upper end of said conduit to control the flow of liquid therethru, a conical spreader element mounted below said valve and in the path of the liquid passing thru said conduit, and adapted to divert liquid outwardly toward the side walls of the container, and an outwardly and downwardly flaring conical artificial top for said container formed at the lower end of said conduit and above said spreader element, said artificial top extending radially outward beyond said spreader element to receive liquid from the spreader element and deliver it to the side walls of the container, said artificial top having a greater slope than said spreader element to form a nozzle effect therebetween and increase the velocity of the liquid as it leaves the spreader.

GEORGE L. N. MEYER.